United States Patent Office 3,366,692
Patented Jan. 30, 1968

3,366,692
PROCESS FOR PREPARING 4,4'-DIHYDROXY-
DIPHENYL SULFONE
Henry Philip Orem, Birmingham, Ala., assignor to United
States Pipe and Foundry Company, Birmingham, Ala.,
a corporation of New Jersey
No Drawing. Filed June 11, 1965, Ser. No. 463,346
8 Claims. (Cl. 260—607)

ABSTRACT OF THE DISCLOSURE

Method for recovering high purity 4,4'-dihydroxydiphenyl sulfone from a mixture containing the 2,4'-isomer comprising reacting the mixture with a sulfonating agent which selectively reacts with the 2,4'-isomer to form water soluble derivatives.

---

This invention relates to the preparation of 4,4'-dihydroxydiphenyl sulfone in high purity relatively free of other isomers; particularly 2,4'-dihydroxydiphenyl sulfone.

When sulfuric acid, mixtures containing sulfuric acid, sulfur trioxide, or oleum is reacted with phenol under suitable conditions and water is eliminated, the end product obtained is dihydroxydiphenyl sulfone. Under normal conditions a mixture of isomers is obtained in the approximate ratio of 65% to 80% of the 4,4'-isomer to 20% to 35% of the 2,4'-isomer, along with a small amount of material of undetermined constitution. Generally this mixture contains about 70% of the 4,4'-isomer and 30% of the 2,4'-isomer. This composition may be deduced from a percent composition diagram in which the percent of 4,4'-isomer is plotted on one ordinate of a graph against the setting point of known mixtures of the two isomers. The literature lists the 4,4'-isomer as having a setting point of 247.7° C. and the 2,4'-isomer with a setting point of 182.6° C.

The mixed isomeric dihydroxydiphenyl sulfone has been found suitable for many uses; however, in other cases it has been desirable to obtain the pure isomer. There have been numerous attempts to separate the pure isomers, generally on a basis of solubility. Foster (U.S. Patent 2,392,139) separated the 4,4'-isomer by fractional crystallization of the calcium complex to get a 4,4'-isomer which had a melting point of 238 to 243° C. which was probably about 87% to 88% 4,4'-isomer. Sauls (U.S. Patent 2,833,828) recrystallized the isomeric mixture from di-n-butyl ether to get a 4,4'-isomer with a melting point of 239–244° C. This material was probably about 88% to 89% 4,4'-isomer. Vegter et al. (U.S. Patent 3,065,274) separated the isomers by difference of solubility in S-tetrachloroethane to get a 4,4'-isomer with a melting point of 243–245° C. This material was probably about 93 to 94% of the 4,4'-isomer.

It has now been discovered that if a mixture containing isomers of dihydroxydiphenyl sulfone is reacted with a compound capable of sulfonating an aromatic ring, such as sulfuric acid, oleum, chlorosulfonic acid, sulfur trioxide dissolved in a suitable inert solvent, or liquid sulfur trioxide, that the sulfonating agent reacts preferentially with the 2,4'-dihydroxydiphenyl sulfone and other unidentified products present to form sulfonic acid derivatives which are soluble in water and may be separated from the unreacted 4,4'-dihydroxydiphenyl sulfone. Based upon this discovery, this invention provides a new and improved method of preparing the very pure 4,4'-isomer by a method which is much simpler and uses less expensive materials and equipment and which is particularly applicable to plant production in which the normal process equipment used in the preparation of the mixed isomers may be used for the preparation of the very pure 4,4'-isomer.

This purification may be carried out by treating the commercial dihydroxydiphenyl sulfone containing the mixture of isomers and which generally has a setting point of 215–223° C. and more frequently about 224–227° C. with a suitable sulfonating agent to give a final product having a setting point of as high as 244–247° C. However, this purification is in no way limited to treatment of the finished product, but may be practiced by sulfonating the reaction mixture at the end of the phenol-sulfuric acid reaction without isolation of the mixed isomeric dihydroxydiphenyl sulfone. In this case, excess phenol in the reaction may also be sulfonated to give water soluble products which are easily separated from the 4,4'-dihydroxydiphenyl sulfone.

A mixture containing isomers of dihydroxydiphenyl sulfone can be reacted with the sulfonating reagent over a wide temperature range of 20–210° C. However, the temperature actually used in carrying out the separation of isomers will depend upon conditions such as the material being treated and the sulfonating reagent used. When the starting material is commercial dihydroxydiphenyl sulfone which is a dry powder, the reaction is preferably carried out within the temperature range of 30 to 110°, since the reaction mixture is pasty and readily mixed. On the other hand, when the starting product is the reaction mixture at the end of the phenol-sulfuric acid reaction, the reaction is carried out at a temperature of 90–210° C. or more preferably within the temperature range of 130–190° C. wherein the mixture is in a fused state.

After the mixture containing the 4,4' and 4,2' isomers is reacted with the sulfonating reagent, it is added to water to dissolve the reaction products from the unreacted 4,4' dihydroxydiphenyl sulfone which remains undissolved. The mixture is filtered, and the filter cake is dissolved by reslurrying it in water with flake caustic soda and heating. The 4,4' dihydroxydiphenyl sulfone is then precipitated from the solution by adding acid to the solution and separated by filtering. After washing and drying the filter cake, the resultant product is 4,4 dihydroxydiphenyl sulfone of high purity.

The following examples in which all amounts are parts by weight will illustrate the application of the process of this invention:

EXAMPLE I

Charge into a suitable container, that is equipped with good stirring mechanism suitable for handling thick slurries, 500 parts of 66° Bé. sulfuric acid. Stir and slowly add 500 parts of commercial dihydroxydiphenyl sulfone having a setting point of 227° C. Stir to a thin paste and heat to 55–60° C. and hold for one hour. Charge into a larger container, equipped with a stirrer, 4000 parts of water, stir and add the paste from the sulfuric acid treatment. Stir for one-half hour and filter. Wash the filter cake with 200 parts of water then reslurry the filter cake in 6600 parts of water and add 71.6 parts of flake caustic soda (76%). Heat to 90° C. to complete solution of the product, filter and cool the filtrate to 49° C. With good stirring, add 101 parts of 66° Bé. sulfuric acid until the solution is acid to Congo red (blue) test paper. Cool to 25° C., filter and wash the filter cake until the filtrate is a pH of 4–5. Dry the product at 105° C. The product has been found to be 342.5–359.4 parts by weight 4–4' dihydroxydiphenyl sulfone and have the following analysis:

| | |
|---|---|
| Color | Light flesh. |
| Melting point, °C. | 242-246. |
| Setting point, °C. | 245. |
| pH | 4.5. |
| Moisture, percent | 0.15. |
| Ash, percent | Nil. |

EXAMPLE II

Charge into a reaction vessel fitted with stirrer, thermometer, heating and cooling device, and condenser for removing distillate, 245 parts of commercial phenol. Stir and add at 43–50° C. 100 parts of 66° Bé. sulfuric acid. Heat until the water and phenol begin to distill, that is, about 150° C. and continue heating at a uniform rate to 214° C. in three and one-half hours and hold at 214–220° C. for two and one-half hours. During this period it is expected that 44 parts of water and eight parts of phenol will be collected. Cool to 145° C. and add 150 parts of 6° Bé. sulfuric acid. Hold at 145–150° C. for 45 minutes and add to 2640 parts of cold water. Stir for one-half hour while cooling to 25° C. and filter. Reslurry in 2640 parts of water and add 25 parts of 76% flake caustic soda. Stir and heat to 65° C. to complete solution, filter, and cool the filtrate to 49° C. then add 32 parts of 66° Bé. sulfuric acid, cool to 25° C. and filter. Wash until the filtrate has a pH of 4–5 on test paper. Dry at 105° C. This product has been found to be 132.3 parts by weight. It has a melting point of 246–247° C. and a setting point of 245° C.

The exact nature of the soluble compound formed by sulfonating the 2,4'-isomer is not known. However, regardless of its chemical nature, the separation of the isomers can be accomplished as described. It will be understood that the invention is not limited to the details of the foregoing description and examples and that reference should be had to the claims for a definition of its limits.

I claim:

1. The process for the separation of 4,4'-dihydroxydiphenyl sulfone from a mixture containing 4,4'-dihydroxydiphenyl sulfone with 2,4'-dihydroxydiphenyl sulfone which comprises reacting said mixture with a sulfonating agent to convert the 2,4'-dihydroxydiphenyl sulfone to a compound which is soluble in water and dissolving the 2,4'-dihydroxydiphenyl sulfone in water.

2. The process according to claim 1 wherein the mixture is reacted with the sulfonating agent at a temperature of 20°–210° C.

3. The process according to claim 1 wherein the mixture in a finely divided solid state is reacted with the sulfonating agent at a temperature of 30°–110° C.

4. The process according to claim 1 wherein the mixture is reacted with the sulfonating agent at a temperature of 130°–190° C. while in a fused state.

5. The process for the separation of 4,4'-dihydroxydiphenyl sulfone from a mixture containing 4,4'-dihydroxydiphenyl sulfone in mixture with 2,4'-dihydroxydiphenyl sulfone which comprises, reacting the mixture with a sulfonating agent, dissolving the soluble components of the reacted mixture with water, dissolving the remaining solid material in a caustic solution, treating the solution with acid to precipitate 4,4'-dihydroxydiphenyl sulfone and separating the precipitate from the solution.

6. The process for the production of high purity 4,4'-dihydroxydiphenyl sulfone which comprises reacting phenol with sulfuric acid to form a first reaction mixture containing 4,4'-dihydroxydiphenyl sulfone in mixture with 2,4'-dihydroxydiphenyl sulfone, reacting the first reaction mixture with a sulfonating agent to render the 2,4'-dihydroxydiphenyl sulfone soluble in water, and treating the reaction mixture with water to dissolve the soluble components leaving 4,4'-dihydroxydiphenyl sulfone of high purity.

7. The process according to claim 6 wherein the first reaction mixture is reacted with sulfuric acid at a temperature of 130°–190° C.

8. The process according to claim 6 wherein the first reaction mixture is reacted with sulfuric acid at a temperature of 145°–150° C.

References Cited

UNITED STATES PATENTS 3,297,766   1/1967   Bradley et al. _____ 260—607

CHARLES B. PARKER, Primary Examiner.

JOSEPH P. BRUST, Examiner.

D. PHILLIPS, Assistant Examiner.